M. S. HOPKINS.
APPARATUS FOR THE RECOVERY OF OILY INK FROM CLOTHS.
APPLICATION FILED MAY 13, 1910.
1,021,738.
Patented Mar. 26, 1912.
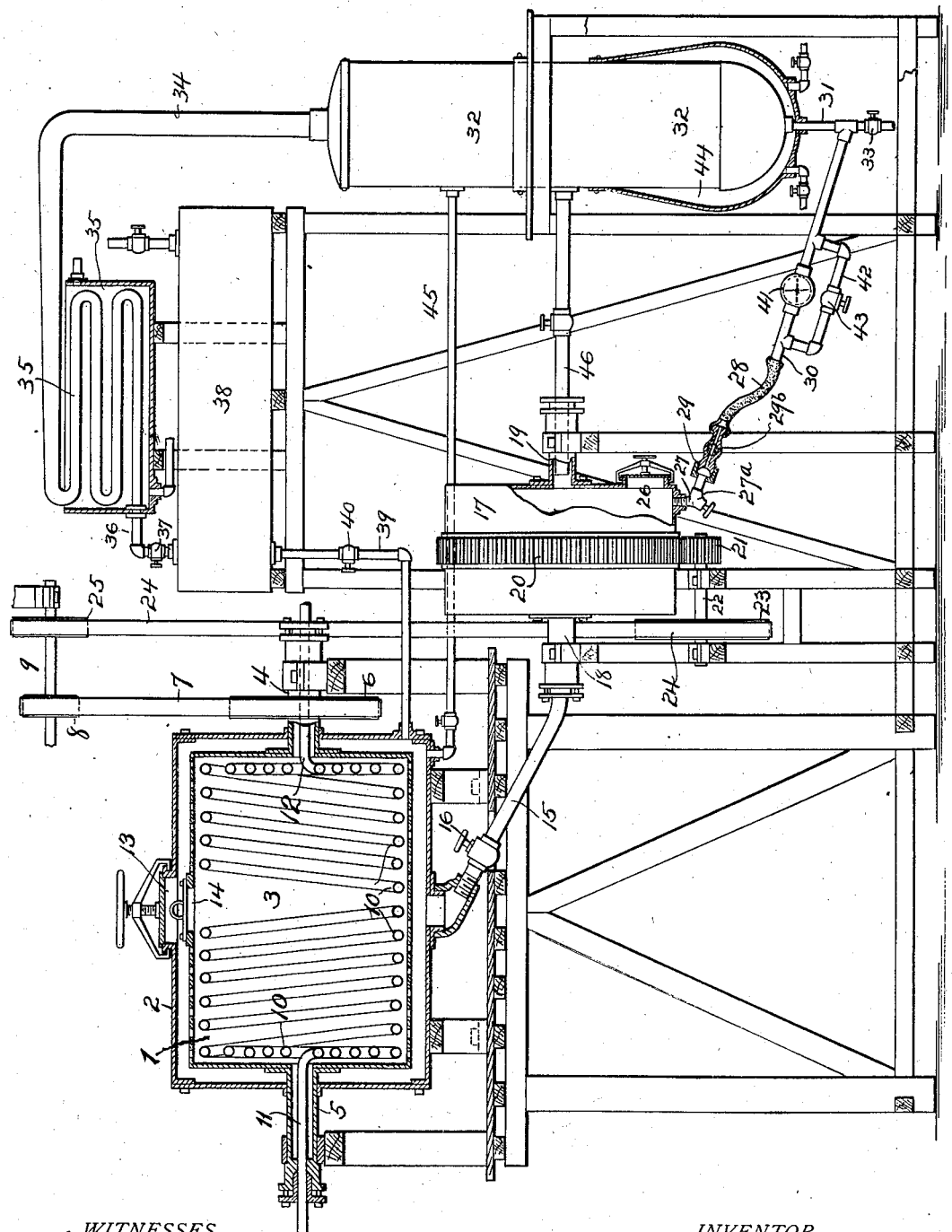
WITNESSES
INVENTOR
M. S. Hopkins
By H. A. Seymour
Attorney

UNITED STATES PATENT OFFICE.

MATHEW S. HOPKINS, OF BALTIMORE, MARYLAND, ASSIGNOR TO THE SEPARATE RECOVERY COMPANY OF AMERICA, OF BALTIMORE, MARYLAND.

APPARATUS FOR THE RECOVERY OF OILY INK FROM CLOTHS.

1,021,738.     Specification of Letters Patent.     Patented Mar. 26, 1912.

Application filed May 13, 1910. Serial No. 561,166.

*To all whom it may concern:*

Be it known that I, MATHEW S. HOPKINS, of Baltimore, in the State of Maryland, have invented certain new and useful Improvements in Apparatus for the Recovery of Oily Ink from Cloths; and I do hereby declare the following to be a full, clear, and exact description of the invention, such as will enable others skilled in the art to which it appertains to make and use the same.

This invention relates to apparatus for the recovery of oily ink from cloths ladened with the same, the object of the invention being to provide simple and efficient apparatus in which the oily ink can be effectually removed from the cloths, and the oily ink recovered from the resultant liquor without injury to the cloths, the oil or the pigment.

A further object is to so construct and arrange the parts of the apparatus, that oily ink can be removed from cloths with the use of a solvent, and the oily ink and the solvent recovered separately.

A further object is to construct and arrange the apparatus so that the fluids employed in removing oily ink from cloths for recovering the constituents of the ink, can be used repeatedly during the operation of the apparatus.

With these objects in view, the invention consists in certain novel arrangements and coöperation of apparatus as hereinafter set forth and pointed out in the claims.

The accompanying drawing is a view of an apparatus showing an embodiment of my invention.

1 represents a washer comprising a rigidly supported casing 2 inclosing a perforated cylinder 3 having tubular journals 4—5 mounted in suitable bearings at the ends of the casing 2. The journal 4 carries a pulley 6 to which power is transmitted by a strap 7 from a pulley 8 on a line shaft 9, for rotating said perforated cylinder. The revoluble inner cylinder 3 of the washer is provided with heating pipes 10 to which steam is conducted by a pipe 11 passing through the tubular journal 5, and the exhaust from the heating pipes 10 finds an exit by way of a pipe 12 extending through the journal 4 of cylinder 3. The outer casing 2 of the washer is provided with a covered inlet at 13 and the inner cylinder is similarly provided with a covered inlet 14 for the introduction of ink-ladened rags.

A pipe 15 (provided with a valve 16) communicates at one end with the bottom of the washer 1, and at the other end with a churn or conglomerator 17,—the latter comprising a hollow body provided with tubular trunnions or journals 18 and 19, with the former of which the pipe 15 communicates. The churn or conglomerator may be rotated in any suitable manner for agitating its contents. For instance, it may be provided with a circumferential gear 20 which receives motion from a pinion 21 on a shaft 22,—the latter being provided with a pulley 23 to receive motion, by means of a strap 24, from a pulley 25 on the line shaft 9. The churn or conglomerator is provided with a covered opening at 26, through which the conglomerated contents can be removed.

The churn or conglomerator 17 is provided with an outlet pipe or nipple 27 with which a flexible pipe 28 is connected by means of a detachable coupling 29. Valves 27$^a$ and 29$^b$ are located at respective sides of the coupling 29. The other end of the flexible pipe is connected with one end of a pipe 30, the other end of which communicates with a pipe 31 connected with the bottom of a still 32, said pipe 31 being provided with a valve 33 below its connection with the pipe 30. A pipe 34 communicates at one end with the upper end of the still 32 and at the other end with the coil of a condenser 35. The other end of the condenser coil is connected, (by means of a pipe 36 provided with a valve 37) with a tank or container 38, and the latter is connected (by means of a pipe 39 having a valve 40) with the washer 1.

A comparatively small quantity of water will be run into the bottom of the still 32, through the pipe 31, and a portion of this water will be forced into the churn or conglomerator 17 through the pipes 28—30, by means of a pump 41 located in the circuit of the pipe 30, for a purpose hereinafter explained. A by-pass 42 is connected with the pipe 30 at respective sides of the pump 41, and this by-pass is provided with a valve 43.

In the operation of my invention, I employ a solvent for the oily ink which is miscible with water, so that when the liquor, consisting of the solvent and the ingredients of the oily ink, is subjected to the action of a small quantity of water, the oily ink will be precipitated or conglomerated. Thus solvents such as alcohol, esters, acetone, etc., can be employed in the operation of my invention. Excellent results can be attained with the use of acetone. To recover the oily ink from ink-ladened cloths, the latter are placed in the perforated cylinder 3 of the washer and the latter supplied with a quantity of solvent, such as acetone, from the tank or container 38. The openings 13—14 will be closed, and then the perforated cylinder 3 will be rotated, the contents of the washer being suitably heated during agitation of the ink ladened cloths in the solvent, by steam passing through the pipes 10. The liquor resulting from this treatment of the cloths in the washer, is discharged through the pipe 15 into the churn 17, and a small quantity of water, sufficient to cause precipitation of the oily ink in the solvent, is forced from the bottom of the still, through the pipes 30 and 28. The valves 27$^a$ and 29$^b$ will then be closed and the pipe uncoupled from the pipe or nipple 27. The churn 17 will now be rotated to cause the churning of the liquor and the consequent conglomeration of the oily ink therein,—the presence of the water in the liquor causing sufficient precipitation of the oily ink to permit the churning operation to conglomerate or collect the same in a mass. When the churning operation shall have been completed, the oily ink, which is heavier than the solvent, will be at the bottom. The churn may then be turned to elevate the nipple 27 above the line of the ink, and the pipe 28 will be again coupled to said pipe or nipple 27. The valves 27$^a$ and 29$^b$, as well as the valve 43 in the by-pass 42 will then be opened and the solution (consisting of the solvent and water) will be discharged into the still. Sufficient heat will be applied to the still (preferably by means of a steam jacket 44) to volatilize the solvent, and the still is made of such height that any water which might be vaporized will be condensed before it can reach the condenser. The volatilized solvent will escape from the top of the still, through the pipe 34 and pass through the coil of the condenser 35. The condensed solvent will flow from the condenser to the tank or container 38, and from the latter, it can be run to the pipe 39 to the washer 1, to be again used for removing oily ink from ink-ladened cloths. The mass of oily ink in the churn or drum 17 will be washed to remove as much as possible of the acetone or other solvent, with the use of water pumped from the still to said churn, and this water will be run back into the still and the solvent volatilized as before explained.

By the operation of my invention, the oily ink is removed from the cloths and recovered as oily ink in the churn or drum 17 without injury to the oil or the pigment.

The mass of oily ink, after having been removed from the churn or drum 17, may be ground on a roller ink mill, to express any water which it might contain, when it will be ready for use as ink.

After the cloths have been sufficiently freed from oily ink, they may be dried in the washer. The washer may be connected, by means of a valve pipe 45 with the still, and the tubular journal 19 of the churn or drum may be connected with the still, by means of a valved pipe 46.

Having fully described my invention, what I claim as new and desire to secure by Letters-Patent, is:—

1. In apparatus of the character described, the combination of means for washing cloths ladened with oily ink in a solvent miscible therewith, means communicating with the washing means for churning the liquor consisting of oily ink, solvent and water to conglomerate the oily ink and recover the ink as such, means to separately withdraw the ink and the mixture of solvent and water from the churn, and means communicating with the churning means for recovering the solvent free from water and oily ink.

2. In apparatus of the character described, the combination of a washer, means for discharging an oil solvent miscible in water, into said washer, a churn communicating with the washer, a still communicating with the churn, means for running water from the still to the churn, means for operating the churn to conglomerate the oily ink in the liquor contained in the churn, to recover the ink as such, and means for recovering the solvent.

In testimony whereof, I have signed this specification in the presence of two subscribing witnesses.

MATHEW S. HOPKINS.

Witnesses:
T. MAURICE,
WILLIAM BARLOW.